United States Patent [19]

Mittler

[11] Patent Number: 4,764,843
[45] Date of Patent: Aug. 16, 1988

[54] VARIABLE ELECTRONIC COMPONENT

[75] Inventor: Martin A. Mittler, Lake Hiawatha, N.J.

[73] Assignee: Voltronics Corporation, East Hanover, N.J.

[21] Appl. No.: 923,677

[22] Filed: Oct. 27, 1986

[51] Int. Cl.$^4$ ............................................. H01G 5/04
[52] U.S. Cl. ................................................... 361/294
[58] Field of Search ............... 361/277, 287, 292, 294, 361/295

[56] References Cited

U.S. PATENT DOCUMENTS

| | | | |
|---|---|---|---|
| 2,984,776 | 5/1961 | Barnes | 361/294 |
| 3,071,716 | 1/1963 | Young | 361/294 |
| 3,084,313 | 4/1963 | Crooks | 361/294 |
| 3,360,697 | 12/1967 | Seiden | 361/294 |
| 3,560,811 | 2/1971 | Farago | 361/294 |

Primary Examiner—Donald A. Griffin
Attorney, Agent, or Firm—Lerner, David, Littenberg, Krumholz & Mentlik

[57] ABSTRACT

A variable electronic component in the nature of a trimmer capacitor for use in a subminiature electronic circuit is adapted to provide a desired wide range of impedance characteristics. The variable electronic component is constructed of a sealed housing having an impedance varying piston driven by a screw supporting a non-axially extending tab or threaded member. The piston includes a cylindrical member which, through conjoining with a cylindrical member of dielectric material, provides a varied range of capacitance to the trimmer capacitor.

22 Claims, 2 Drawing Sheets

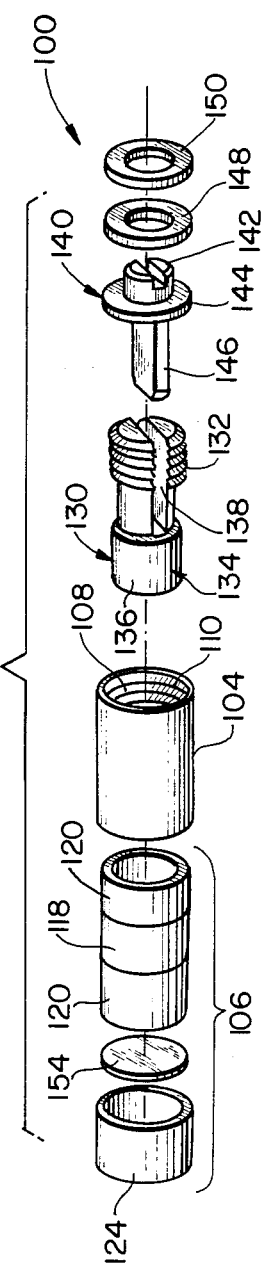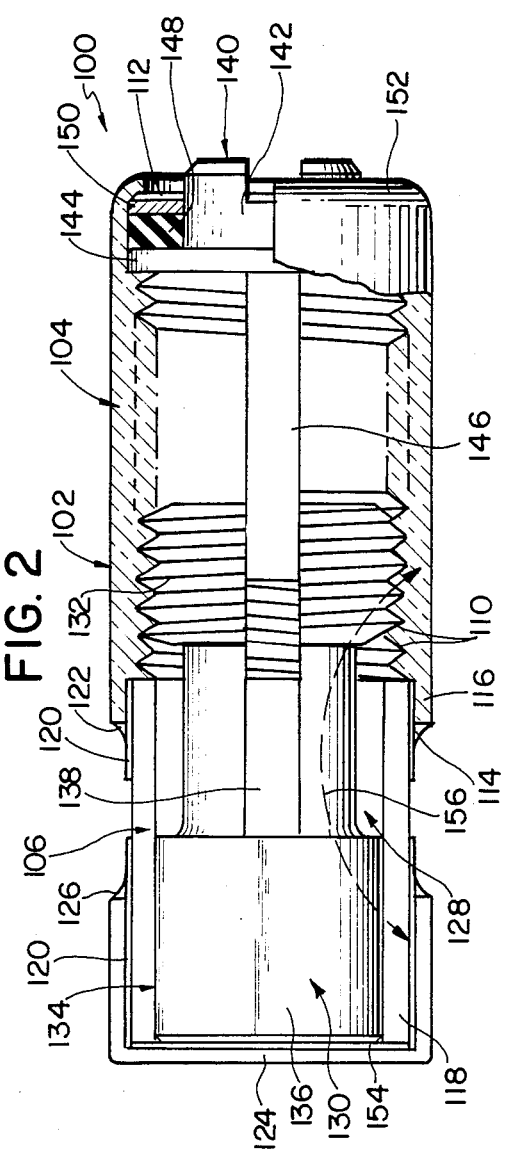

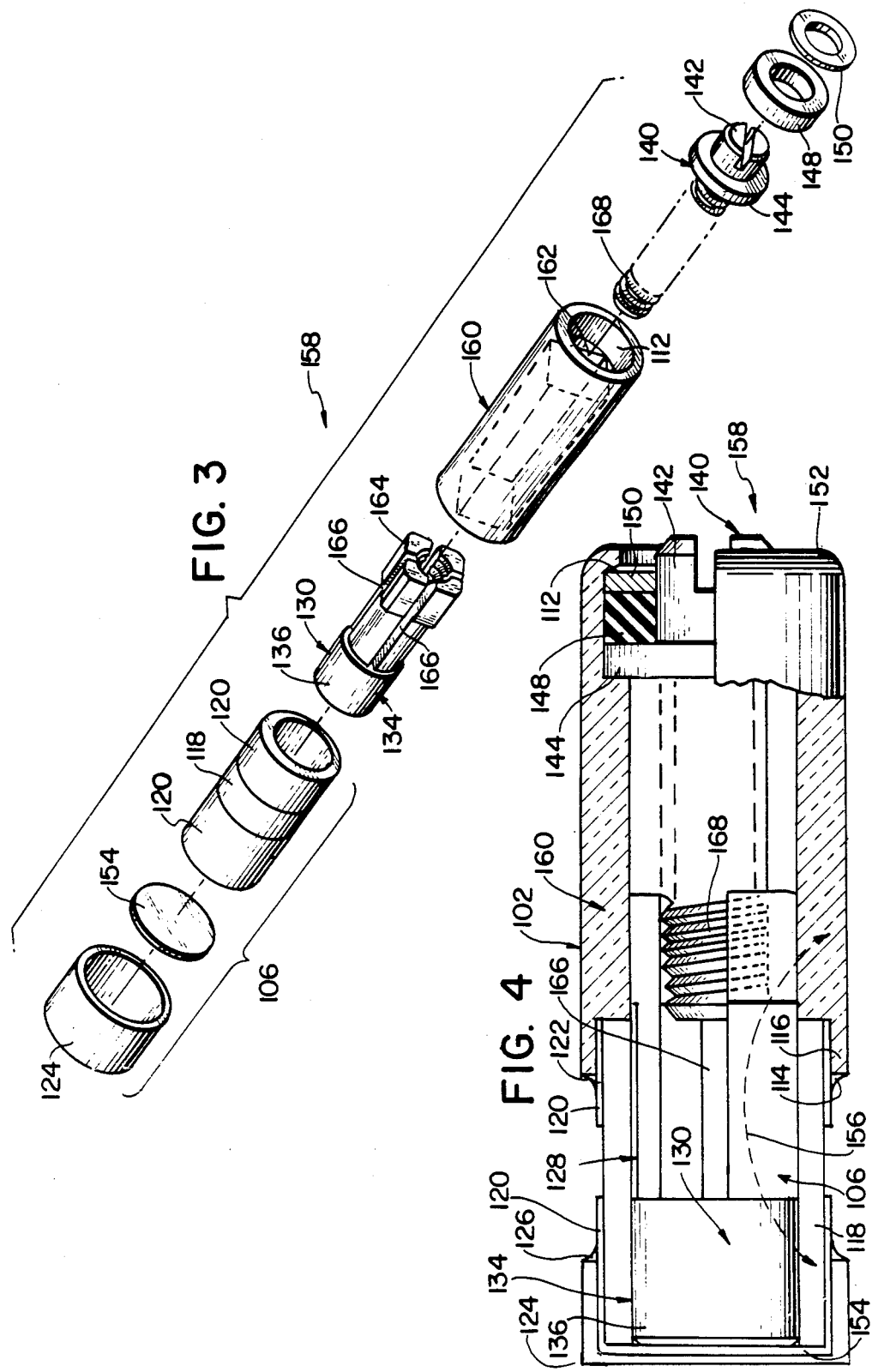

VARIABLE ELECTRONIC COMPONENT

BACKGROUND OF THE INVENTION

The present invention relates in general to a variable electronic component, and more particularly, to a variable trimmer capacitor adapted to provide an operative range of impedance characteristics by advancing an internal piston in response to the operation of a sealed drive element using an implement such as a screw driver or the like.

In the advancing technologies of computers, testing equipment, appliances and other fields, various types of hybrid electronic circuits, integrated electronic circuits, micro strip amplifiers, micro electronic systems and other electronic devices are being developed and which are being made on increasingly smaller scale and size than has been known heretofore. In accomplishing this end, these devices are generally mounted on small flat insulating bases known as substrates. These various devices incorporate or have formed therein or co-act with various types of electronic components such as inductors, capacitors, resistors, potentiometers, etc., which in turn must be as small as possible to meet the demands of the reduced scale or size of these devices.

The known miniature devices have reached their functional limit even with the best precision manufacturing techniques because certain elements of these devices cannot be reduced further at reasonable cost for commercially acceptable regularly usable devices. For example, the presently known variable trimmer capacitors used in miniature electronic circuits require a mounting frame and a tuning mechanism. There is a limit as to how these elements can be miniaturized and still provide effective and proper function. Further, the mounting elements and tuning mechanisms, when connected in miniature electronic circuits handling high frequencies create unwanted inductance and capacitance in the systems and devices in which they are used because they form stray current paths when placed in close proximity to each other, as may be required in miniature systems or small electronic designs, thereby producing unwanted circuit interaction such as excessive coupling.

U.S. Pats. Nos. 3,679,940 and 3,757,266, which patents are assigned to the same assignee of the within invention, each disclose variable electronic components, such as capacitors and resistors, which are particularly adapted to meet and overcome the problems of these known devices by eliminating the area and mass of conventional mounting frames, tuning mechanisms and other elements heretofore used, and instead integrate the elements of these variable electronic components directly into the circuit. These components are primarily designed as low-profile structures exceedingly small in size, simple in construction, easily adjustable, reliable, in operation, easily replaceable and reproduceable in quantity without sacrificing uniformity or performance.

However, owing to the exceedingly small size of these variable electronic components, the ability to readily adjust these components have likewise become exceedingly more difficult. These components have been provided with an upturned tab to be engaged by a suitable adjustable tool, for example, a tweezer, so as to effect the desired operative range of impedance characteristics of the component. As these components become increasingly smaller in size, it can be appreciated that there is a need to provide a more accurate and reliable means of providing the requisite adjustment. To this end, there has been included in these variable electronic components a rack and pinion assembly operable upon rotation by a miniature screw driver. However, the extremely small size of these components have rendered the construction of a rack and pinion assembly having extremely small gear teeth relatively difficult and expensive, subject to breakage and stripping, and thereby rendering its use less than desirable.

One such variable electronic component which overcomes the aforementioned disadvantages is known from U.S. Pat. No. 4,575,779, which patent is assigned to the same assignee of the within invention. This known variable electronic components is constructed to include an eccentric whose rotational motion imparts reciprocal movement to an impedance-bearing member. The eccentric is operative by engagement with an implement such as a screw driver and the like. However, the elements of this variable electronic component are not contained within the housing, and are therefore exposed to the environment which can effect the component's impedance characteristics due to corrosion and other such action over time.

A sealed variable electronic components, in the nature of a capacitor, is known from U.S. Pats. No. 3,483,450 and U.S. Pat. No. Re. 30,406, the former patent being assigned to the same assignee of the within invention. The latter known capacitor is provided with an end enclosure cap to provide the sealing function. This, of necessity, mandates that the cap be removed each time an adjustment is required, in addition to preventing the use of a shaft to provide for outside adjustment of the capacitor using a knob and the like. As to the former known variable capacitor, its construction results in a relatively long internal high-frequency current path which limits its practical resonance frequency of operation between 1.2 and 1.5 GHz.

Accordingly, it can be appreciated that there is an unsolved need for a sealed variable electronic component, such as a variable trimmer capacitor, which can provide a desired operative range of impedance characteristics, for example, up to 10 GHz, quickly, simply and inexpensively by adjustment using a suitable implement such as a screw driver and the like.

SUMMARY OF THE INVENTION

It is broadly an object of the present invention to provide a variable electronic component which overcomes or avoids one or more of the foregoing disadvantages resulting from the above-mentioned known variable electronic components, and which fulfills the specific requirements of such a variable electronic component for use in subminiature electronic circuits such as those disposed on a supporting substrate. Specifically, it is within the contemplation of one aspect of the present invention to provide a variable electronic component which includes a sealed drive element which facilitates the adjustment of the component to provide a desired operative range of impedance characteristics at relatively high frequency due to a relatively short internal high-frequency current path, as such components become increasingly smaller in size.

Another aspect of the present invention is to provide a variable electronic component which is relatively small and cheap to build, and wherein the area and mass of conventional mounting means and tuning means of known devices are substantially eliminated.

Another object of the present invention is to provide a variable electronic component particularly adapted for use in high-frequency subminiature electronic systems and devices.

Another object of the present invention is to provide a variable electronic component which is relatively easy to adjust to provide fine tuning for the electronic circuit for which it will be used.

In accordance with one embodiment of the present invention, there is provided a variable electronic component constructed of a housing including an internally threaded portion and a first impedance varying portion, a piston rotatably arranged within the housing, the piston including an externally threaded end engaging the threaded portion of the housing and a second impedance varying portion received within the first impedance varying portion of the housing, the externally threaded end having a slot extending along the longitudinal axis of the piston, and drive means rotatably received within one end of the housing adjacent the threaded portion, the drive means having a tab extending into the slot of the piston, whereby rotation of the drive means varies the extent of conjoining of the first and second impedance varying portion to provide a desired range of impedance characteristics to the component.

In accordance with another embodiment of the present invention, there is provided variable electronic components constructed of a housing having a hollow portion and a hollow first cylindrical impedance varying portion, a piston slidingly arranged within the housing, the piston including an internally threaded end received within the hollow portion of the housing and a second cylindrical impedance varying portion received within the first cylindrical impedance varying portion of the housing, and drive means rotatably received within one end of the housing adjacent the hollow portion, the drive means having an externally threaded member engaging the internally threaded end of the piston, whereby rotation of the drive means varies the extent of conjoining of the first and second cylindrical impedance varying portions to provide a desired range of impedance characteristics to the component.

BRIEF DESCRIPTION OF THE DRAWINGS

The above description, as well as further objects, features and advantages of the present invention will be more fully understood by reference to the following detailed description of a presently preferred, but nonetheless illustrative, variable electronic component in accordance with the present invention, when taking in conjunction with the accompanying drawings, wherein:

FIG. 1 is an enlarged exploded view of one embodiment of a variable trimmer capacitor constructed in accordance with the present invention and showing the individual components thereof;

FIG. 2 is a partial cross-sectional view of the variable trimmer capacitor shown in FIG. 1, showing its assembled relationship for providing variable impedance characteristics;

FIG. 3 is another embodiment of a variable trimmer capacitor constructed in accordance with the present invention and showing the individual components thereof; and FIG. 4 is a partial cross-sectional view of the variable trimmer capacitor shown in FIG. 3, showing its assembled relationship for providing variable impedance characteristics.

DETAILED DESCRIPTION

Referring to the drawings, wherein like reference numbers represent like elements, there is shown in FIGS. 1 and 2 a variable electronic component in the nature of a variable trimmer capacitor generally designated by reference numeral 100, and constructed in accordance with one embodiment of the present invention. The trimmer capacitor 100 is constructed of a housing 102 which includes an internally threaded portion 104 and an impedance varying portion 106. The housing 102 includes a longitudinally extending bore 108 circumscribed by a plurality of threads 110 terminating adjacent a non-threaded open end 112. The other open end 114 of the housing 102 is provided with a non-threaded step 116. The housing 102 is fabricated from suitable electrically conductive metals such as brass and the like.

The impedance varying portion 106 is constructed of a cylindrical hollow member 118 having a uniform inside diameter and formed from dielectric material such as sapphire and the like. The outer circumferential surface of the cylindrical hollow member 118 is provided with a pair of spaced apart metallized areas 120. The cylindrical hollow member 118 is secured to the internally threaded portion 104 by inserting one end thereof into engagement with the non-threaded step 116 and soldering to the metallized area 120 at location 122. The other end of the cylindrical hollow member 118 is closed by a hollow cap 124 constructed of electrically conductive material, such as brass and the like. The cap 124 receives the other end of the cylindrical hollow member 118 and is secured thereat by soldering to the metallized area 120 at location 126. As a result of this construction, the impedance varying portion 106 is sealed to the internally threaded portion 104 to provide a longitudinal opening extending therebetween as designated generally by reference member 128.

A piston 103, constructed of electrically conductive material such as brass, Invar and the like, is received within the opening 128 formed by the internally threaded portion 104 and impedance variable portion 106. The piston 130 includes an externally threaded end 132 and an impedance varying portion 134 constructed of a cylindrical member 136 of uniform outside diameter. The cylindrical member 136 is dimensioned to provide a sliding fit internally within the cylindrically hollow member 118 upon rotation of the piston 130. The piston 130 is further provided with a slot 138 extending along the longitudinal axis of the piston so as to divide at least the externally threaded end 132 into upper and lower halves. The effective outside diameter of the externally threaded end 132 of the piston 130 is slightly greater than the effective inside diameter of the internally threaded portion 104 of the housing 102, so as to provide frictional threaded engagement therebetween. This frictional engagement, in the nature of a torgue, enhances the operation of the trimmer capacitor 100 by eliminating play between the engaged threads, increasing the ability to accurately fine tune the trimmer capacitor, and preventing movement of the piston 130 within the housing 102 once the trimmer capacitor has been turned to the desired capacitance.

The piston 130 is driven to vary the impedance characteristics or capacitance of the trimmer capacitor 100 by means of a drive screw 140. The drive screw 140 is constructed of a slotted head 142 supporting a retaining collar 144 and a flat tab 146 extending in sliding fit within the slot 138 of the piston 130. The head 142 and retaining collar 144 are received within the non-threaded open end 112 of the internally threaded portion 104. Adjacent the retaining collar 144 and surrounding the slotted head 142 is an O-ring 148 and metal retaining washer 150. The driver screws 140 is sealed within the non-threaded open end 112 by means of the O-ring 148, and is retained thereat by rolling the outer edge 152 of the housing 102 forming the non-threaded open end 112 radially inward to provide an opening of reduced diameter, which diameter is sufficient to allow the head 142 to protrude therethrough. The construction of the trimmer capacitor 100 is completed by inserting an insulating washer 154 of dielectric material within the cap 124 to prevent electrical continuity between the cap and piston 130.

The impedance characteristics or capacitance of the trimmer capacitor 100 is varied by rotating the drive screw 140 using an implement such as a screw driver or the like engaged within the slotted head 142. As the drive screw 140 is rotated, the piston 130 is caused to rotate within the housing 102 so as to advance or retract the impedance varying portion 134 within the cylindrical hollow member 118 of the impedance varying portion 106, thereby varying the extent of conjoining thereof. As shown in FIG. 2, the current path 156 indicated by dashed lines extends from cap 124 to the internally threaded portion 104, which both function as electrical terminals, and through a portion of the piston 130. The construction of the trimmer capacitor 100 to include a short current path 156, results in the trimmer capacitor having an increased operating frequency, for example, up to 10 GHz.

Turning now to FIGS. 3 and 4, there is shown a trimmer capacitor generally designated by reference 158 and constructed in accordance with another embodiment of the present invention. As the trimmer capacitor 158 shown in FIGS. 3 and 4 includes a number of components of similar construction to those disclosed in accordance with the embodiment of the trimmer capacitor 100 as shown in FIGS. 1 and 2, only the differences therebetween will be described. Specifically, the housing 102 includes a non-threaded portion 160 having a non-threaded bore 162 of non-circular cross-section extending between the non-threaded open end 112 and non-threaded step 116. The non-threaded portion 160 is secured to the impedance varying portion 106 in the manner described with reference to the trimmer capacitor 100.

The piston 130 includes an internally threaded end 164 having a cross-sectional outer shape corresponding to the cross-sectional internal shape of the non-threaded bore 162. The non-threaded bore 162 and internally threaded end 164 are dimensioned to provide a sliding fit therebetween. In accordance with the preferred embodiment, the cross-sectional shape of the nonthreaded bore 162 and internally threaded end 164 is square or rectangular, although other shapes such as oval and the like are contemplated. The internally threaded end 164 is divided into four quadrants by a pair of longitudinally extending slots 166 arranged transverse to each other. The slots 166, like slot 138 of the trimmer capacitor 100, provide the piston 130 with a somewhat resilient internally threaded end 164 which is biased outwardly to provide a torquing action as previously described. In this regard, the effective outside diameter of the internally threaded end 164 of the piston 130 is slightly greater than the effected inside diameter of the non-threaded bore 162 of the non-thread portion 160, so as to provide a sliding frictional fit therebetween. Threadingly received within the internally threaded end 164 of the piston 130 is an externally threaded member 168 which extends longitudinally from the remaining collar 144 of the drive screw 140.

The operation of the trimmer capacitor 158 is virtually identical to the operation of the trimmer capacitor 100. That is, the impedance characteristics and capacitance of the trimmer capacitor 158 are varied by rotating the drive screw 140 using a screwdriver or other such implement engaged within the slotted head 142. Upon rotation of the drive screw 140, the piston 130 is caused to be slid longitudinally within the opening 128, as opposed to being rotated as is the case in the trimmer capacitor 100. Rotation of the piston 130 is prevented by the non-circular cross-section of both the non-threaded bore 162 of the housing 102 and internally threaded end 164 of the piston. The impedance characteristics and capacitance are determined by the extent of conjoining of the impedance varying portion 134 of the piston 130 within the cylindrical hollow member 118. A similar short current path 156 is established to provide a high resonance operating frequency, with the cap 124 and non-threaded portion 160 defining electrical terminals.

Thus, there has been illustrated and described a simple variable electronic component in the nature of a trimmer capacitor 100, 158, of great versatility and with a minimum of members adapted to be made, in particular, for very small size electronic circuits. The variable electronic component is characterized by the fact that the members thereof are independently and directly connected to the electronic circuit and which can be adjusted over the desired range of impedance characteristics using the drive screw 140. The components of the variable electronic component are further constructed to have good electrical contact at all times to produce limited or very little electrical noise, having low contact resistance and minimal electrical inductance in use and in assembled relationship in the electronic circuit to which they are connected. Further, the variable electronic component can be readily and simply adjusted by means of conventional implements such as screwdrivers and the like.

Although the invention here has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A variable electronic component comprising a housing including an internally threaded portion and a first impedance varying portion, a piston having a longitudinal axis arranged rotatable thereabout and movable axially therealong within said housing, said piston including an externally threaded end engaging said threaded portion of said housing and a second impedance varying portion received within said first impedance varying portion of said housing, said externally threaded end having a slot extending along the longitudinal axis of said piston, and drive means rotatably received within one end of said housing adjacent said threaded portion, said drive means having a tab extending into said slot of said piston, whereby rotation of said drive means causes said piston within said housing to rotate about said longitudinal axis and to move axially therealong so as to vary the extent of conjoining of the first and second impedance varying portions to provide a desired range of impedance characteristics to said component, the axial movement of said piston within said housing varying the extent of engagement of said tab of said drive means within said slot of said piston.

2. A variable electronic component according to claim 1, wherein said first impedance varying portion comprises a hollow cap of electrical conductive material coupled in spaced relationship to another end of said internally threaded portion of said housing by a hollow cylindrical member of dielectric material arranged therebetween.

3. A variable electronic component according to claim 2, further including a disc of dielectric material received within said cap.

4. A variable electronic component according to claim 1, wherein said housing includes a non-threaded end for retaining a portion of said drive means thereat upon rotation of said drive means within said housing.

5. A variable electronic component according to claim 4, further including a seal arranged between said drive means and said housing at said non-threaded end.

6. A variable electronic component according to claim 1, wherein said second impedance varying portion comprises a cylindrical member of uniform outside diameter.

7. A variable electronic component according to claim 1, wherein said slot divides said externally threaded end of said piston into first and second halves.

8. A variable electronic component according to claim 7, wherein said slot and said tab are dimensional to provide a sliding fit therebetween.

9. A variable electronic component according to claim 7, wherein the effective outside diameter of said externally threaded end of said piston is slightly greater than the effective inside diameter of said internally threaded portion of housing, whereby frictional threaded engagement is provided therebetween.

10. A variable electronic component according to claim 9, wherein said frictional threaded engagement is operative for retaining the extent of conjoining of said first impedance varying portion with said second impedance varying portion.

11. A variable electronic component comprising a housing having a hollow portion and a hollow first cylindrical impedance varying portion, a non-rotatable piston having a longitudinal axis slidingly arranged therealong within said housing, said piston including an internally threaded end received within said hollow portion of said housing and a second cylindrical impedance varying portion received within said first cylindrical impedance varying portion of said housing, and drive means rotatably received within one end of said housing adjacent said hollow portion, said drive means having an externally threaded member engaging said internally threaded end of said piston, whereby rotation of said drive means causes said piston within said housing to move axially along said longitudinal axis so as to vary the extent of conjoining of the first and second cylindrical impedance varying portions to provide a desired range of impedance characteristics to said component.

12. A variable electronic component according to claim 11, wherein said first cylindrical impedance varying portion comprises a hollow cap of electrical conductive material coupled in spaced relationship to another end of said hollow portion of said housing by a hollow cylindrical member of dielectric material arranged therebetween.

13. A variable electronic component according to claim 12, further including a disc of dielectric material received within said cap.

14. A variable electronic component according to claim 11, wherein said hollow portion of said housing includes an open end for retaining a portion of said drive means thereat upon rotation of said drive means within said housing.

15. A variable electronic component according to claim 14, further including a seal arranged between said drive means and said hollow portion of said housing at said open end.

16. A variable electronic component according to claim 11, wherein said second cylindrical impedance varying portion comprises a cylindrical member of uniform outside diameter.

17. A variable electronic component according to claim 11, wherein the interior of said hollow portion of said housing and the exterior of said internally threaded end of said piston have non-circular cross-sections.

18. A variable electronic component according to claim 17, wherein said cross-sections are rectangular in shape.

19. A variable electronic component according to claim 17, wherein said internally threaded portion of said piston includes longitudinal slots dividing said internally threaded portion into four quadrants.

20. A variable electronic component according to claim 17, wherein the effective outside diameter of said internally threaded end of said piston is slightly greater than the effective inside diameter of the non-circular cross-section of said hollow portion of housing, whereby frictional sliding engagement is provided therebetween.

21. A variable electronic component according to claim 11, wherein the axial movement of said piston within said housing varies the extent of engagement of said externally threaded member within said internally threaded end.

22. A variable electronic component comprising a housing having a hollow portion and a hollow first cylindrical impedance varying portion, a piston slidingly arranged within said housing, said piston including an internally threaded end received within said hollow portion of said housing and a second cylindrical impedance varying portion received within said first cylindrical impedance varying portion of said housing, the interior of said hollow portion of said housing and the exterior of said internally threaded end of said piston having non-circular cross-sections, and drive means rotatably received within one end of said housing adjacent said hollow portion, said drive means having an externally threaded member engaging said internally threaded end of said piston, whereby rotation of said drive means varies the extent of conjoining of the first and second cylindrical impedance varying portions to provide a desired range of impedance characteristics to said component.

* * * * *

UNITED STATES PATENT AND TRADEMARK OFFICE
CERTIFICATE OF CORRECTION

PATENT NO. : 4,764,843
DATED : August 16, 1988
INVENTOR(S) : Mittler

It is certified that error appears in the above-identified patent and that said Letters Patent is hereby corrected as shown below:

Column 2, line 14, "components" should read --component--.
Column 2, line 25, "components" should read --component--.
Column 2, line 28, "assinged" should read --assigned--.
Column 2, line 64, "aspect" should read --object--.
Column 4, line 39, "103" should read --130--.
Column 4, line 63, "turned" should read --tuned--.
Column 5, line 6, "driver screws" should read --drive screw--.
Column 6, line 5, "remaining" should read --retaining--.
Column 6, line 46, "here" should read --herein--.

Signed and Sealed this

Eleventh Day of April, 1989

*Attest:*

DONALD J. QUIGG

*Attesting Officer*  *Commissioner of Patents and Trademarks*